US010504510B2

(12) United States Patent
Georges et al.

(10) Patent No.: US 10,504,510 B2
(45) Date of Patent: Dec. 10, 2019

(54) MOTION ADAPTIVE SPEECH RECOGNITION FOR ENHANCED VOICE DESTINATION ENTRY

(71) Applicant: Nuance Communications, Inc., Burlington, MA (US)

(72) Inventors: Munir Nikolai Alexander Georges, Kehl (DE); Josef Damianus Anastasiadis, Aachen (DE); Oliver Bender, Aachen (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 15/578,523

(22) PCT Filed: Jun. 10, 2015

(86) PCT No.: PCT/US2015/035110
§ 371 (c)(1),
(2) Date: Nov. 30, 2017

(87) PCT Pub. No.: WO2016/200381
PCT Pub. Date: Dec. 15, 2016

(65) Prior Publication Data
US 2018/0158455 A1 Jun. 7, 2018

(51) Int. Cl.
*G10L 15/22* (2006.01)
*G06F 3/00* (2006.01)
(Continued)

(52) U.S. Cl.
CPC .......... *G10L 15/22* (2013.01); *G01C 21/3608* (2013.01); *G10L 15/065* (2013.01);
(Continued)

(58) Field of Classification Search
CPC ....... G10L 15/065; G10L 15/30; G10L 15/32; G10L 15/22
See application file for complete search history.

(56) References Cited

U.S. PATENT DOCUMENTS

| 2011/0257974 A1 | 10/2011 | Kristjansson et al. |
| 2012/0330651 A1* | 12/2012 | Obuchi .................. G10L 15/01 704/225 |
| 2013/0238332 A1 | 9/2013 | Chen |

FOREIGN PATENT DOCUMENTS

| WO | 2011149837 A1 | 12/2011 |
| WO | 2015017303 A1 | 2/2015 |

OTHER PUBLICATIONS

Notification of Transmittal of the International Search Report and the Written Opinion of the International Searching Authority, or the Declaration, Application No. PCT/US2015/035110, entitled "Motion Adaptive Speech Recognition for Enhanced Voice Destination Entry," consisting of 13 pages, dated Jan. 27, 2016.
(Continued)

*Primary Examiner* — Shreyans A Patel
(74) *Attorney, Agent, or Firm* — Ohlandt, Greeley, Ruggiero & Perle, L.L.P.

(57) ABSTRACT

A method or associated system for motion adaptive speech processing includes dynamically estimating a motion profile that is representative of a user's motion based on data from one or more resources, such as sensors and non-speech resources, associated with the user. The method includes effecting processing of a speech signal received from the user, for example, while the user is in motion, the processing taking into account the estimated motion profile to produce an interpretation of the speech signal. Dynamically estimating the motion profile can include computing a motion weight vector using the data from the one or more resources associated with the user, and can further include interpolat-
(Continued)

ing a plurality of models using the motion weight vector to generate a motion adaptive model. The motion adaptive model can be used to enhance voice destination entry for the user and re-used for other users who do not provide motion profiles.

12 Claims, 8 Drawing Sheets

(51) Int. Cl.
*G10L 15/065* (2013.01)
*G10L 15/30* (2013.01)
*G01C 21/36* (2006.01)
*G10L 15/32* (2013.01)

(52) U.S. Cl.
CPC .............. *G10L 15/30* (2013.01); *G10L 15/32* (2013.01); *G10L 2015/223* (2013.01); *G10L 2015/225* (2013.01); *G10L 2015/227* (2013.01); *G10L 2015/228* (2013.01)

(56) References Cited

OTHER PUBLICATIONS

Notification Concerning Transmittal of International Preliminary Report on Patentability, "Motion Adaptive Speech Recognition for Enhanced Voice Destination Entry," dated Dec. 21, 2017.

\* cited by examiner

MOTION ADAPTIVE SPEECH RECOGNITION FOR ENHANCED VOICE DESTINATION ENTRY

RELATED APPLICATION

This application is the U.S. National Stage of International Application No. PCT/US2015/035110, filed Jun. 10, 2015, which designates the U.S., and was published in English. The entire teachings of the above application is incorporated herein by reference.

BACKGROUND OF THE INVENTION

Automatic speech recognition (ASR) generally means converting an acoustic signal (sound) into a sequence of words (text). Following the statistical approach, one typically collects speech statistics to train language models and acoustic models which are subsequently employed during speech recognition. In general, language models relate to the probability of particular word sequences and acoustic models relate to sounds in a language. Speech recognition can also be enhanced by semantic models in order to generate a semantic representation (meaning) of the recognized text. Voice destination entry (VDE) is one of the main applications for ASR in vehicles, e.g., cars, and on mobile phones.

SUMMARY OF THE INVENTION

A method for motion adaptive speech processing includes dynamically estimating a motion profile that is representative of a user's motion based on data from one or more resources associated with the user, and effecting processing of a speech signal received from the user, the processing taking into account the estimated motion profile to produce an interpretation of the speech signal.

The data from the one or more resources can include sensor data and data from a non-speech resource associated with the user. For example, the sensor data may include at least one member selected from the group consisting of position, speed, acceleration, direction, and a combination thereof. Further, the data from the non-speech resource can include at least one member selected from the group consisting of navigation system data, address book data, calendar data, motion history data, crowd sourced data, configuration data, and a combination thereof. For example, the data from the non-speech resource can include information about an event at a particular time and location, e.g., a rock concert in a city at six o'clock in the evening.

In an embodiment, dynamically estimating the motion profile includes computing a motion weight vector using the data from the one or more resources associated with the user. Further, dynamically estimating the motion profile can include interpolating a plurality of models using the motion weight vector to generate a motion adaptive model.

As used herein, a model, including a motion adaptive model, can be a language model, an acoustic model, a semantic model, or a combination thereof. For example, a multilingual acoustic model may be particularly useful when crossing (language) borders. A semantic model can give an interpretation of all or a portion of an utterance. For example, a user may say, "Play music from Madonna." A semantic model can give an interpretation for the word "Madonna," which can be an artist. The semantic model can also be used to classify the entire utterance, e.g., to provide the interpretation: "This is music-related and the user probably likes to listen to some music using his music player."

In an embodiment, computing the motion weight vector includes determining a relation between the non-speech resource and a language resource associated with the plurality of models, e.g., a plurality of language models. Alternatively or in addition, at least one of the models can be associated with a geographic area or with at least one of geographic area, time and date. Interpolating the models, e.g., the language models, can result in a probability that the user is or will be located in the geographic area. For example, in a use-case where the user is driving car and the user's route is considered, the interpolation can result in a probability of where the user will be at lunch time. In another use-case example, there is an event at a particular venue and many people are driving to/from this event at a certain time, so that they search for similar things in that area, such as restaurants, parking spaces, etc. The same place, and time, but at a different date (i.e., without an event) may be less relevant to speech recognition of users' voice queries. One reason for the reduced relevance can be that users would generally not be looking for a parking space there without an event, because the venue is far away from a city, from other points of interest, etc. Alternatively or in addition, dynamically estimating the motion profile can further include interpolating the motion adaptive model with a background model, e.g., a background language model.

Interpolating one model with another model can include combining the models into an interpolated (e.g., combined) model. For example, two grammars, each being a model related to a geographical area, can be combined and then used to process a speech signal.

The speech signal received from the user can include at least one of a voice audio signal, a video signal, e.g., from the user's mouth or face, and data from gestures, e.g., for text entry.

The speech signal can be received from the user while the user is in motion.

The user need not be in motion when the speech signal is received. For example, location of the user itself can be used for motion adaptive ASR, the user's direction (and speed) being 0. For example, the user may be looking for something in the user's vicinity, speaking into a smartphone.

A system for motion adaptive speech processing includes a motion profile estimator at a client and a processor. The motion profile estimator is configured to estimate a motion profile that is representative of a user's motion dynamically based on data from one or more resources associated with the user. The processor is configured to effect processing of a speech signal received from the user, e.g., while in motion, the processing taking into account the estimated motion profile to produce an interpretation of the speech signal.

In an embodiment, the motion profile estimator is configured to compute a motion weight vector using the data from the one or more resources associated with the user. Further, the motion profile estimator can be configured to interpolate a plurality of models using the motion weight vector to generate a motion adaptive model. At least one of the models can be associated with a geographic area, and the motion profile estimator can interpolate the models to produce a probability that the user is or will be located in the geographic area. Alternatively or in addition, the motion profile estimator can be further configured to interpolate the motion adaptive model with a background model.

In general, automatic speech recognition (ASR) can be understood as a process of analyzing a speech signal to obtain a textual representation of the speech. For example, a user may utter, "Where is Berlin?" The transcription of the utterance may be "where is berlin" and the interpretation can be "berlin"+"direction to go."

In an embodiment of the system for motion adaptive speech processing, the processor is configured to perform automatic speech recognition (ASR) of the speech signal at the client using the estimated motion profile, the ASR producing the interpretation of the speech signal.

In another embodiment, the processor is configured to send the speech signal and estimated motion profile to a cloud service to perform ASR of the speech signal using the estimated motion profile, the ASR producing the interpretation of the speech signal.

In yet another embodiment, the processor is configured to send the speech signal to a cloud service for ASR, receive results of the ASR from the cloud service, and re-rank the results using the estimated motion profile to produce the interpretation of the speech signal.

A computer program product includes a non-transitory computer readable medium storing instructions for performing a method for motion adaptive speech processing, the instructions, when executed by a processor, cause the processor to dynamically estimate a motion profile that is representative of a user's motion based on data from one or more resources associated with the user, and effect processing of a speech signal received from the user, e.g., while in motion, the processing taking into account the estimated motion profile to produce an interpretation of the speech signal.

Embodiments of the present invention may have many advantages. Currently, the language model adaptation for certain domains is limited to small user-dependent content such as contact lists. Adaptation methods based on past user queries or user content that is derived from other applications typically does not work for address destination entry because of the great diversity of addresses. Embodiments of the present invention incorporate the individual motion profile of the user to constrain the search space to user-relevant destinations. This directly leads to an increasing accuracy. Also, this personalizes the search space based on the user's behavior.

Today, crowd sourced data is used to guess the popularity of named entities such as points of interest. This approach, however, has drawbacks. On the one hand, crowd sourced data is not available in real-time. On the other hand, it is still unclear if there is a correlation between crowd sourced data, e.g., WIKIPEDIA® click-through rate for certain addresses, and voice queries. Popularity measures derived from webpages are not necessarily related to voice destination queries. For some applications, a certain portion of the search space can be activated or deactivated via a dialog, e.g., the system or the user activates the city or state where the user is staying. In contrast, embodiments of the present invention use a continuous adaptation process based on the user's motion profile. For example, if a user is leaving a city on the highway, it is more likely that an address is entered which is somewhere on the current driving direction, e.g., the next city. On the other hand, it can be recognized that the user is currently looking for an address in his vicinity by analyzing the user's motion profile. In this case, the speech recognizer can focus on these addresses which are more likely to be relevant to the user. It is also possible to incorporate information from the navigation system, e.g., when the user is currently on route to a destination. The absence of a motion profile will lead to using the generalized approach that is currently deployed for all users. Hence, the novel embodiments can serve the current functionality, which is useful for backwards compatibility and product diversity.

Dynamically estimating a user's motion profile and interpolating language models based on the motion profile is particularly useful for cross-border navigation. This is a distinct advantage in regions that include multiple countries with different languages, such as in Europe, where cross-border navigation presents a complex, multi-lingual problem.

Embodiments use motion profiles to improve speech recognition and can be applied for natural language understanding. Advantageously, methods for motion adaptive speech processing can improve the accuracy of voice destination entry individually for each user. Such methods are close to the behavior of a human assistant and, for at least that reason, will further contribute to increase the acceptance of voice enabled applications.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
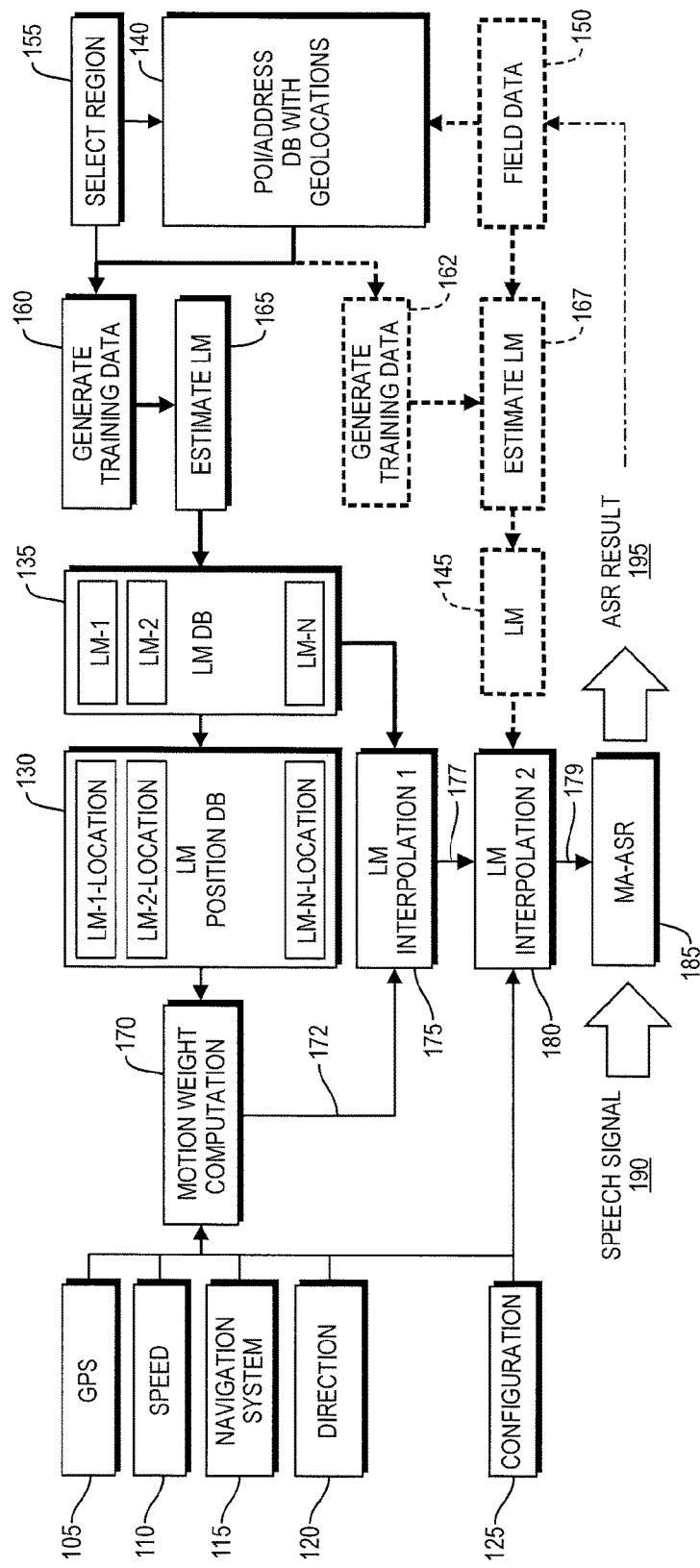
FIG. 1 is a schematic diagram of a method and system for motion adaptive speech processing.

A description of example embodiments of the invention follows.

Voice destination entry, e.g., address entry by voice, is challenging in at least two aspects: First, the large amount of postal addresses (e.g., more than 10 Million for the US) and points of interest (e.g., more than 3 Million for the US) requires a speech recognizer to operate close to the acoustical resolution limit (e.g., a vocabulary size greater than 2 Million words). The number of addresses and number of points of interest are growing, not at least because users can set their own points of interest. Second, the sparse amount of training data makes it difficult to estimate reliable statistical models to constrain the search space by incorporating syntactical knowledge.

Currently, a trade-off between dialog stages and destination coverage is often employed to achieve a usable accuracy. Both dialog stages and destination coverage have an impact on the user's experience using voice for destination entry. Typically, increasing the number of dialog stages can decrease the user experience. Also, increasing the destination coverage typically results in a loss of recognition accuracy due to the increased model space.

The methods and systems described therein provide a solution that closes the gap between dialog and one-shot voice destination entry for mobile phones and car head-units.

Crowd sourced data is used on a daily basis to estimate named entity popularities. This data is used to constrain the search space in order to achieve a more precise recognition on common named entities, such as common addresses. The disadvantage of using crowd sourced data is a performance degradation on less common named entities, e.g., for small and un-popular regions. This drawback is sometimes resolved by incorporating dialog stages to activate and deactivate certain regions.

Artificial data is sometimes used to estimate a statistical language model or a grammar for different regions, e.g., for the U.S., Europe, etc. Embodiments of the present approach can estimate a statistical language model or a grammar for small regions, e.g., for cities in Germany. Furthermore, embodiments can provide for on-the-fly interpolation of each region model, for example, by utilizing a user's motion profile, as further described below.

Also commonly used is a limitation on a syntactical level, e.g., by requiring that the address has to be spoken in a certain order, such as, "street-city-state." This approach of syntactical constraints is not applicable for other domains, such as point of interest search, where a human-intuitive order is often not determinable.

Embodiments of the present approach build upon commonly used online adaptation methods. Certain embodiments may be employed in recommendation systems, e.g., for delivering personalized advertising on mobiles.

Embodiments of the current approach can include or utilize the analysis of sensor data, such as speed and distance measurements. Such analysis typically involves digital signal processing, and may require processing strategies that increase robustness, in order to deal with unpredictable behavior, e.g., to deal with wrong sensor data, and to detect wrong sensor data at all.

A method and corresponding system that incorporate a motion profile of a user to improve speech recognition is described. Although the method is described for voice destination entry, it can be extended to other domains. An example is voice restaurant search. The method can enhance the recognition of restaurants if the motion profile allows to conclude that the user is somewhere in the pedestrian area of a city around lunchtime. This can enhance the one-shot voice destination entry experience for the user.

In an embodiment, the method continuously interpolates a set of statistical language models by analyzing the motion profile(s) of the speaker. The statistical model can be based on one or more Markov n-gram models; it can also be based on one or more statistical grammars. For example, one or more statistical language models are estimated for region(s) under consideration, e.g., for cities, states, countries. The current behavior of the user can be achieved, e.g., estimated, by a uniform interpolation of all or a portion of these models. Activation and deactivation capability can be achieved by binary interpolation weights. For example, the current city has a weight of '1'—activated—whereas all others are '0' weighted—disabled. A continuous interpolation weight vector can be estimated based on the speaker's (e.g., the user's) motion profile.

In a particular example, the processing can include the following procedures:

a) Generate a weight vector, e.g., frequently or on demand, of the speech recognizer:
   gather sensor data—e.g., current speed, direction and the like
   generate a motion profile—e.g., driving for one hour, still on track according to the navigation system
   analyze motion—e.g., most likely on a highway, looking for a service station
   generate a motion weight vector—e.g., enhance points of interest in the next region
b) Recognize speech:
   update the motion interpolation weight—e.g., pass the motion weight vector to the recognizer
   stream, or otherwise send, the speech to the recognizer—e.g., into the cloud or locally
   evaluate results—e.g., display to the user or enter into the navigation system.

Online adaptation methods are well known in speech recognition for both pre-filter search technology and speech decoding based, for example, on a weighted finite state transducer. These adaptation methods are used to interpolate between certain domains, e.g., based on dialog stages or a topic detection method. Embodiments of the present invention can utilize these methods to incorporate motion profiles during speech recognition. However, embodiments of the present approach are not limited to online speech adaptation; they can also be used as a re-ranking technique, e.g., for processing third-party result lists according to the user's motion profile. Hence, the methods and systems according to the present invention are also applicable if the speech recognizer cannot be touched (e.g., modified). For example, the motion adaptive speech processing described herein can be applied as an add-on to existing systems and deployments where the core ASR functionality cannot be modified.

The motion profile can be estimated from various sensors, such as space-based satellite navigation systems, acceleration sensors, speed measurements, altimeters, etc. The information can be analyzed together with a map and aligned with other information sources, e.g., the navigation history or favorite places and activities from the user profile. In this way, the analyzer can incorporate the current route, alternative routes, or places and locations which might be of interest for the user.

All or any portion of this information can be used to generate an aligned weight vector with the set of available statistical language models. For example, one can analyze and align the weight vector statistically. However, because insufficient training data may be available, an initial starting point may need to be derived manually. The developer has to determine the default mode, e.g., no movement at all, and its impact on speech recognition, e.g., activation of the current region or uniform distribution of the weight vector. It is also configurable what the behavior should be while driving slow, fast, winding, etc. The motion profile analyses can be customized or dependent on certain other criteria. For example, the analyses may be different for luxury cars, family cars and sports cars.

The technique is suited for embedded use-cases to reduce the required computational power and to increase the accuracy, e.g., for point of interest search. In particular, hybrid use-cases can benefit from this approach. The motion profile can be estimated on the client and passed as one or more interpolation weights to the server. The server uses the interpolation weight(s) to personalize its broad combined address and point of interest statistical language model. In this way, the server can prevent its current behavior and generalization approaches on the one hand. On the other hand, the server can deliver accurate and personalized speech solutions for certain customers, e.g., automotive premium car manufactures.

Features that distinguish embodiments of the present approach from other approaches include the estimation of statistical models for certain geographical regions independently from each other, the interpolation procedure that enables a continuous adaptation based on the user's motion profile, and the hybrid use-case to address both speech recognition for the broad crowd and enhanced user-adapted speech recognition for dedicated customers.

FIG. 1 is a schematic diagram of a method and system for motion adaptive speech processing. The method and system can be described in terms of resources and modules that utilize the resources in a process. Among the resources are, for example, Global Positioning System (GPS) 105, speed 110, navigation system 115, direction 120, and configuration 125. The resources associate with the user can be raw sensor measurements and pre-processed data to derive the user's behavior. The raw sensor measurements, e.g., data from GPS 105 and in-vehicle sensors, can be used to determine the speed 110 and direction 120. The navigation system 115 can provide possible driving routes and destinations. Using configuration 125, the user, the customer or both can adjust the impact of motion adaptation in various ways. The resources 105, 110, 115 and 125 are typically dynamic resources that, along with the dynamic motion weight computation, make up the dynamic aspect of the system of FIG. 1. Other resources and modules illustrated in FIG. 1 are typically considered static, or at least do not update as frequently as the dynamic resources. The static resources and modules can provide a fall back mode if no dynamic resources or processing are available.

Additional resources include a language model position database ("LM Position DB") 130, a language model database ("LM DB") 135, a point of interest or address database ("POI/address DB with geolocations") 140. The database 130 stores the reference geolocation for each of the N language models, illustrated as LM-1-location, LM-2-location and LM-N-location. The language model database 135 is a database collection of N language models, illustrated as LM-1, LM-2 and LM-N. The point of interest and address database 140 is a database collection of addresses, points of interest, etc.

Some embodiments optionally include a background language model ("LM") 145 and field data (e.g., crowd sourced data) 150. The optional resources 145 and 150 provide background language for backwards compatibility and to serve users who do not provide any motion data.

Among the processing modules that can be employed by the example system and method illustrated in FIG. 1 are: select a region 155, generate training data 160, 162, estimate a language model ("estimate LM") 165, 167, motion weigh computation 170, first language model interpolation ("LM interpolation 1") 175, second language model interpolation ("LM interpolation 2") 180, and motion adaptive automatic speech recognition ("MA-ASR") 185. Some modules, such as modules 160,162, are typically executed "off-line," that is, not with every query or user transaction. For an embedded system, modules 160 and 162 may even be executed once at system production time. Other processing modules, such as modules 170, 175, are typically executed with every user transaction.

The select region module 155 can specify certain regions, e.g. cities, depending on the available data resources. The selection can be performed by a human expert or automatically by the system. The selection 155 can specify a particular database, e.g., database 140, or a particular set of points of interest and addresses in the database 140 to be used by other processing modules, including those that generate training data and estimate language models. The training data generation module 160, and the optional module 162, can generate voice destination queries based on statistical grammars and natural language phrases. The language model estimation module 165, and the optional module 167, can perform language model estimation, for example, using a Markov n-gram model or a statistical grammar.

The motion weight computation module 170 evaluates the sensor measurements and data from non-speech resources. The module then computes the relation between these non-speech resources and the language resources. The module further computes a motion interpolation weight vector 172 for speech recognition.

The interpolation modules 175, 185 can merge N language models (e.g., LM-1 to LM-N) for speech recognition. In one example, e.g., for the use-case "driving a car," the first interpolation module 175 can interpolate N language models according to the motion interpolation weight vector 172 to generate a motion adaptive language model 177. The interpolation module can also interpolate language models from several motion interpolated language models, e.g., for the use-case "a user's route." The impact of the interpolation at module 175 is configurable by the user, the customer or both. For example, the user or customer can disable motion adaptive speech recognition. The user or customer can also configure different behaviors for different cars (luxury car, sports car, value car, rented car, Sport Utility Vehicle, etc.) and/or user-profiles (e.g., based on age, business, etc.). One or the other configuration can have a relatively strong bias to motion adaptation and/or other models and/or using a different weight computation. For example, one configuration can enhance locations in the vicinity of the car's location, while another configuration can enhance destinations which are near the highway, but not directly there (e.g., a better restaurant). The user, customer or both can also choose the modes or models that are to be considered. For example, the event-model may be not relevant for a business use-case. In contrast, a motion adaptive hotel-model can be particularly relevant for a business or rental car use-case.

In one example, the second interpolation module 180 interpolates the motion adaptive language model 177 with a background language model 145 to generate a motion adaptive language model 179. This interpolation enables backwards compatibility without the need of a dedicated set-up. As with module 175, the impact of the interpolation at module 180 is configurable (125) by the user, the customer, or both.

As illustrated in FIG. 1, the motion adaptive automatic speech recognizer 185 processes a speech signal 190 using a motion adaptive language model 177, 179 to produce an ASR result 195. The ASR result 195 can be presented to the user, e.g., as an interpretation of the speech signal. Optionally, the ASR result can be used to update field data 150, which in turn can be used to update database 140.

The above described system and method for motion adaptive speech processing provide several advantageous features. For example, the motion adaptive speech recognition is customizable by the customer and its users. Different use-cases are realizable, such as an embedded use-case, a cloud use-case or a hybrid use-case. Example use-cases are described below, for example, with reference to FIGS. 6-8.

As described above, the example system and method illustrated in FIG. 1 includes features that can provide backwards compatibility and increased accuracy for those users who do not provide motion data. For example, the generated motion adaptive language model(s) can be re-used to enhance voice destination entry for users who do not provide motion profiles.

Embodiments can employ motion history and crowd source data in the processing of a speech signal. Using the user's motion history can increase the recognition accuracy for past voice queries according to the user's motion behavior. For example, embodiments can compute an exponential decaying average (e.g., a moving average) over motion interpolation weights from a user and use the resulting motion interpolation weight vector for motion adaptive speech recognition. Using crowd sourced data can include using motion behavior of the crowd to increase the recognition accuracy using the background language model. For example, embodiments can compute an average motion interpolation weight vector over all users. Embodiments can also use live traffic data, for example, to increase the recognition accuracy by evaluating live traffic data using the background language model. For example, embodiments can compute respective motion interpolation weight vectors for one or more traffic-hot spots. In general, embodiments can include any combination of the following features: motion adaptive speech recognition based on motion behavior of the crowd, motion adaptive speech recognition that is personalized for each user, and motion adaptive speech recognition based on live traffic data (e.g., instead of click-through rates from webpages).

Figure 2:
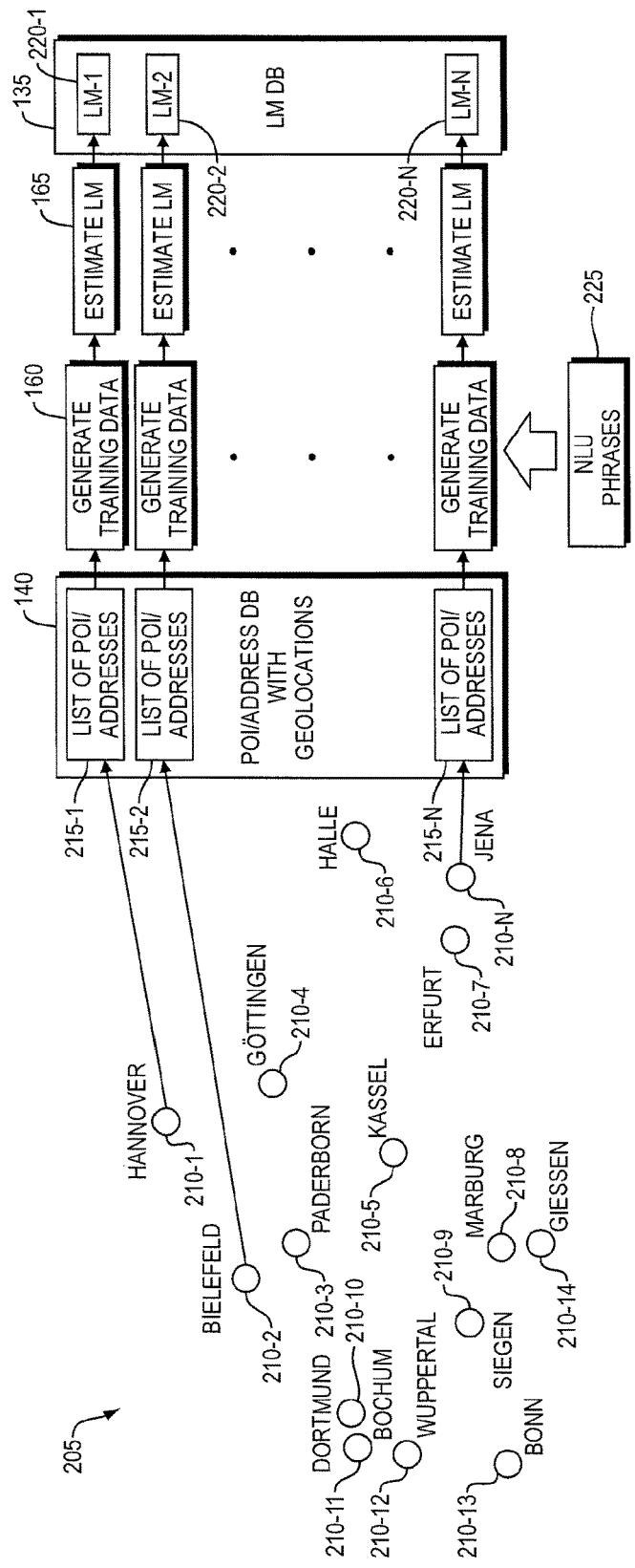
FIG. 2 is a schematic diagram illustrating language model estimation.

FIG. 2 is a schematic diagram illustrating language model estimation. In the example shown language models are estimated for a region 205 that includes cities 210-1 through 210-14, and 210-N (collectively 210). For each city, there is a corresponding entry, e.g., entries 215-1, 215-2, etc. up to 215-N, in a database 140. The entry includes a list of points of interest (POIs), addresses or both. Along with the points of interest and addresses, the database 140 stores the respective geolocations of the points of interest and addresses. For example, for city 210-1 ("Hanover"), the database 140 includes a list 215-1 of points of interest and addresses along with their respective geolocations. Similarly, there are respective lists of points of interest and addresses 215-2, 215-N for cities 210-2 ("Bielefeld") and 210-N ("Jena"). The method generates training data (160) for each list of points of interest addresses and, from the training data, estimates a language model (165). Thus, in the example shown for the cities 210-1, 210-2 and 210-N, generation of the training data results in respective language models LM-1, LM-2 and LM-N, which are stored in the language model database ("LM DB") 135. As illustrated at 225, training data can be generated using natural language understanding (NLU) phrases.

Figure 3:
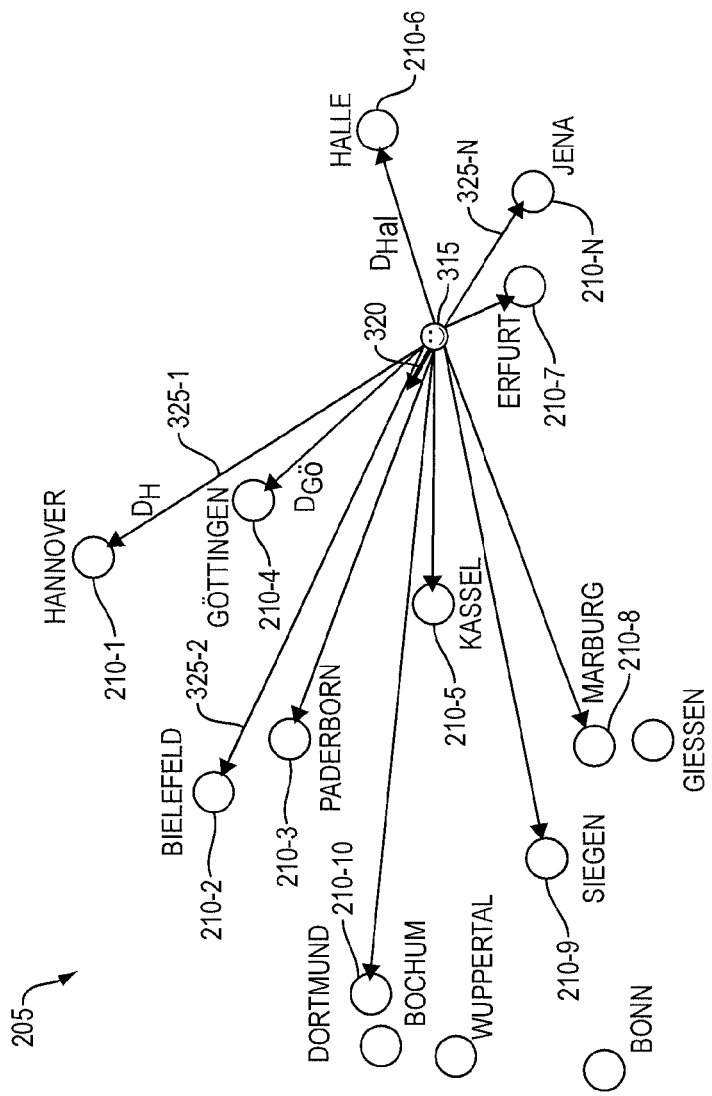
FIG. 3 is a schematic diagram illustrating motion weight computation based on a user's position, speed and direction.

FIG. 3 is a schematic diagram illustrating motion weight computation based on a user's position, speed and direction. An example use-case is a user driving a car. Input for the motion weight computation can include locations of language models ("LM-n-locations", where n=1–N) for the region 205 of interest, e.g., cities 210-1, 210-02, etc. up to 210-N, and the driver's position, direction, and speed. Speed is a hint whether the user is driving in a city and is looking for something in the city or whether the user is driving on the highway and might look for something at the user's destination (or something 'ahead of the user'). For example, given the user's position 315, direction 320 and speed, voice destination queries are, for example, more likely for the cities 210-5 ("Kassel") and 210-4 ("Göttingen") than for the cities 210-N ("Jena") and 210-6 ("Halle"), since the user is driving in a direction that is away from the latter cities. Note, however, that the probability for voice queries for points of interest and addresses in the city 210-N ("Jena") is not zero, because the user might just be driving in the wrong direction.

In one example, the computation includes the following procedures:
  a) Estimate the driver's direction 320;
  b) Compute the vectors (e.g., 325-1, 325-2, etc. through 325-N) from the driver's location 315 to each of the LM-n-locations and scale those vectors with the driver's direction 320 and speed;
  c) Compute the distances (e.g., $D_H$, $D_{G\ddot{o}}$, $D_{Hal}$) between the driver and LM-n-locations;
  d) Compute the motion interpolation weight vector, e.g.:

$$\omega_n = \left( \frac{\frac{1}{D_n}}{\sum_i \frac{1}{D_i}} \right)$$

In the above computation, n=1–N, for all the cities in the region 205, $D_I$ is the distance to a city from the user's current position, and con represents the probability in a direction of a particular city. The example computation is a linear estimator, but a logarithmic estimator can also be used.

Figure 4:
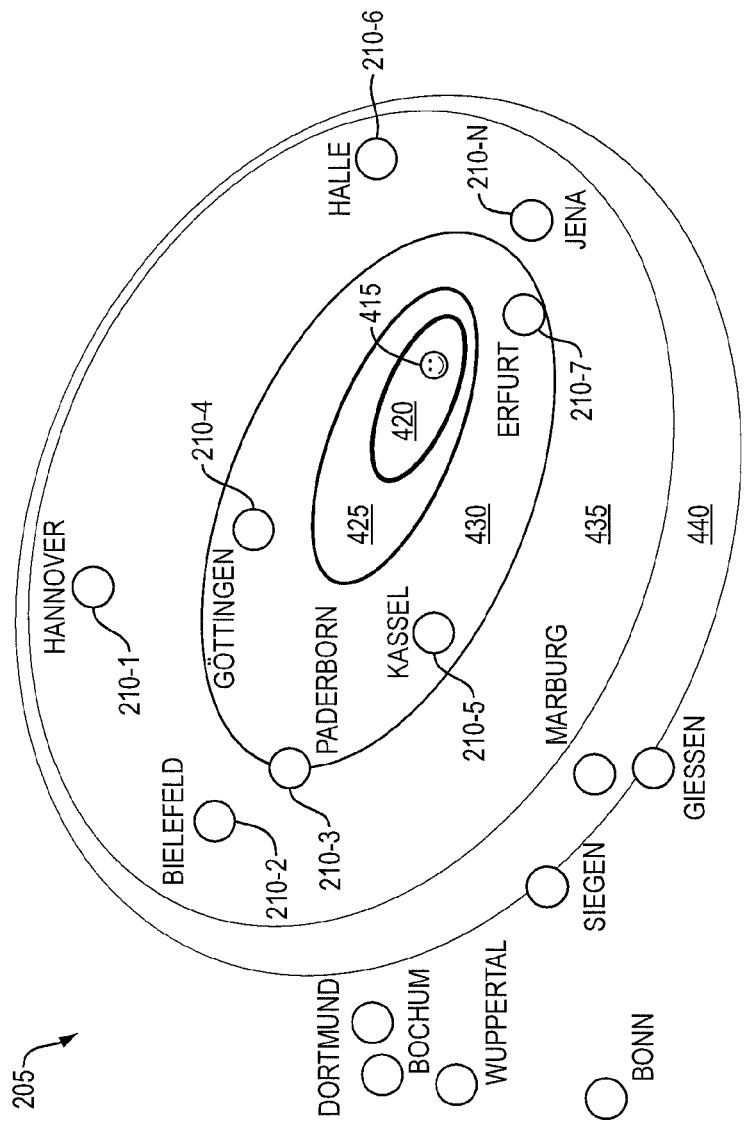
FIG. 4 is a schematic diagram illustrating motion weight computation for uncertain speed or direction measures.

FIG. 4 is a schematic diagram illustrating motion weight computation for uncertain speed or direction measures. An example use-case is slow motion driving (or walking) with just GPS available. Input for the motion weight computation can include locations of language models (LM-n-locations) for a region 205, e.g., cities 210-1, 210-2, etc. through 210-N, and the user's (e.g., the driver's) position. The user's current position is shown at 415. The estimated probable next position of the user is illustrated as areas of decreasing likelihood 420, 425, 430, 435 and 440 (the thinner the outer boundary line, the smaller the likelihood). Although discrete areas are shown, the likelihood may vary on a continuum. For example, voice destination queries for addresses in cities 210-N ("Jena"), 210-6 ("Halle"), 210-1 ("Hannover") and 210-2 ("Bielefeld") are comparable likely, as the locations of these cities all fall into the same area 435. Queries with addresses in cities 210-7 ("Erfurt"), 210-5 ("Kassel"), 210-4 ("Göttingen"), or 210-3 ("Paderborn"), the cities falling on or into area 430, are more likely than queries in cities falling into area 435, e.g., 210-N ("Jena"), 210-6 ("Halle"), 210-1 ("Hannover") and 210-2 ("Bielefeld").

In one example, the computation of the motion weight includes the following procedures:
  a) Compute a probable next position of the user by using a tracking method, e.g., a Kalman-filter with Gaussian distributions;
  b) Compute the weight at each LM-n-location based on the probable next position, e.g., area 430 is more likely than area 435.

For example, each entry in the weight vector (reference points) can be assigned to one point on the map of the region. The Kalman-filter approach provides a probability for each of these points given the "current" position of the user and the movement. A postponed normalization can be used, if the Kalman-filter is more precise than the resolution of reference-points on the map.

Figure 5:
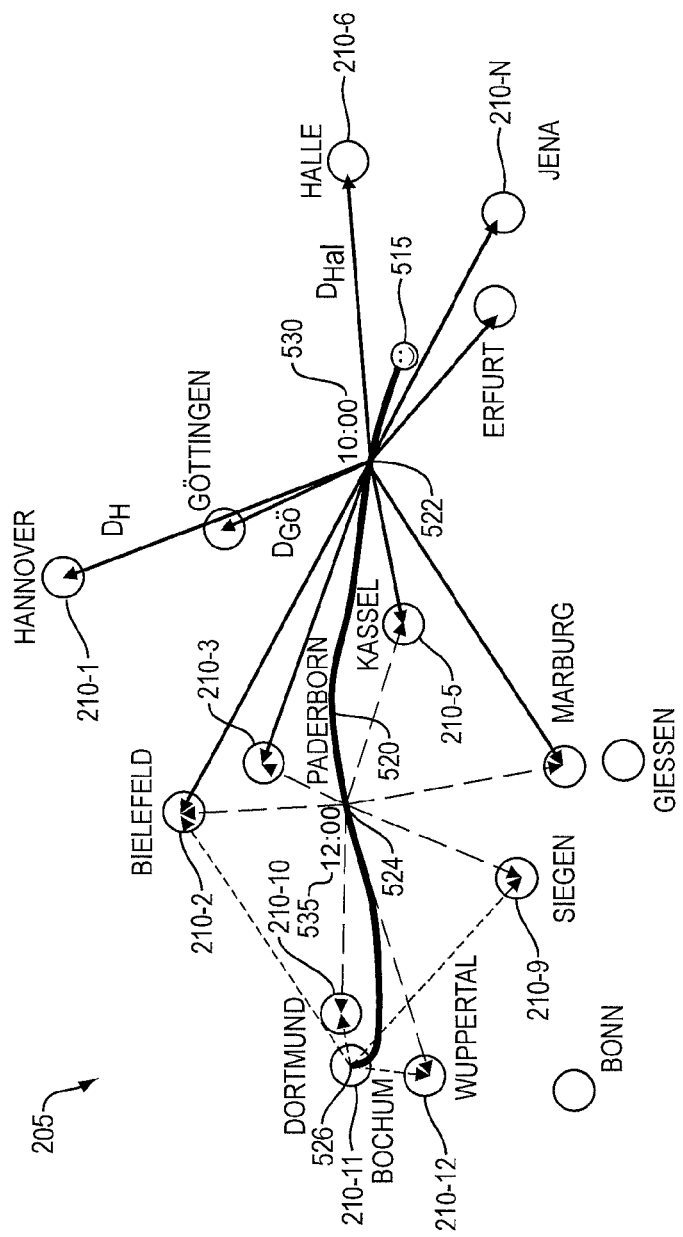
FIG. 5 is a schematic diagram illustrating motion weight computation based on a user's route.

FIG. 5 is a schematic diagram illustrating motion weight computation based on a user's route. An example use-case is a known route for the user. Input for the motion weight computation can include locations of language models (LM-n-locations) for a region 205, e.g., cities 210-1, 210-2, etc., a driving route 520 of the user 515 and time 530, 535. For example, voice destination queries with addresses in city 210-3 ("Paderborn") or city 210-5 ("Kassel") are more likely than queries with addresses in 210-6 ("Halle") or 210-N ("Jena") for at least two reasons. First, 210-3 ("Paderborn") and 210-5 ("Kassel") are close to the user's route 520. Second, as shown at 535, the user will reach a location 524 near those cities at lunch time (535) and might query for restaurants, parking and other places. As a further example, voice destination queries for addresses in cities 210-11 ("Bochum") and 210-10 ("Dortmund") are more likely than queries for addresses in 210-9 ("Siegen") or 210-12 ("Wuppertal"), because 210-11 ("Bochum") and 210-10 ("Dortmund") are located at shorter distances from the route's endpoint 526 (e.g., the user's destination) than 210-9 ("Siegen") or 210-12 ("Wuppertal"). In FIG. 5, distances from positions along the user's route 520 to cities are shown as arrows. For positions 522, 524, and 526, the arrows have solid, long-dashed and short-dashed lines, respectively.

In one example, the computation of the motion weight includes the following procedures:
 a) Compute the distances (e.g., $D_H$, $D_{Gö}$, $D_{Hal}$) between points on the route (e.g., 522, 524 and 526) and LM-n-locations;
 b) Compute the motion iriterpolation weights for interpolating each vector, e.g., as described above with reference to FIG. 3.

In part (b) above, one can first compute one interpolation weight vector given a set of motion weights, for example, by using an average. In contrast, one can also compute models for each weight set and combine them afterwards. This is useful to combine motion-adaptive models with 'other' models, e.g., models biased on 'domain specific' data.

Example embodiments of embedded, cloud and hybrid use-cases will be described. In an example embedded use-case, language resources are processed on the cloud and passed to the embedded device (via deployment or update), while all other components are on the embedded device. In an example cloud use-case, sensor measurements are passed to the cloud and processed on the cloud; all methods and resources are on the cloud, including the speech recognizer. In an example hybrid use-case, the sensor measurements and motion weight computation is performed on the embedded device. The interpolation of the language model(s) and the speech recognition happens in the cloud. A fall back ASR is used on the device for situations where no network connectivity is available. A re-scoring of results can be performed on the device to merge results from the cloud and embedded recognizer. Another option is to run client-side recognition in parallel with cloud-based recognition and combine the results of each. The results can also be weighted using the motion profile vector, e.g., reference-points can be kept in the result or the results can be mapped to certain reference points.

Figure 6:
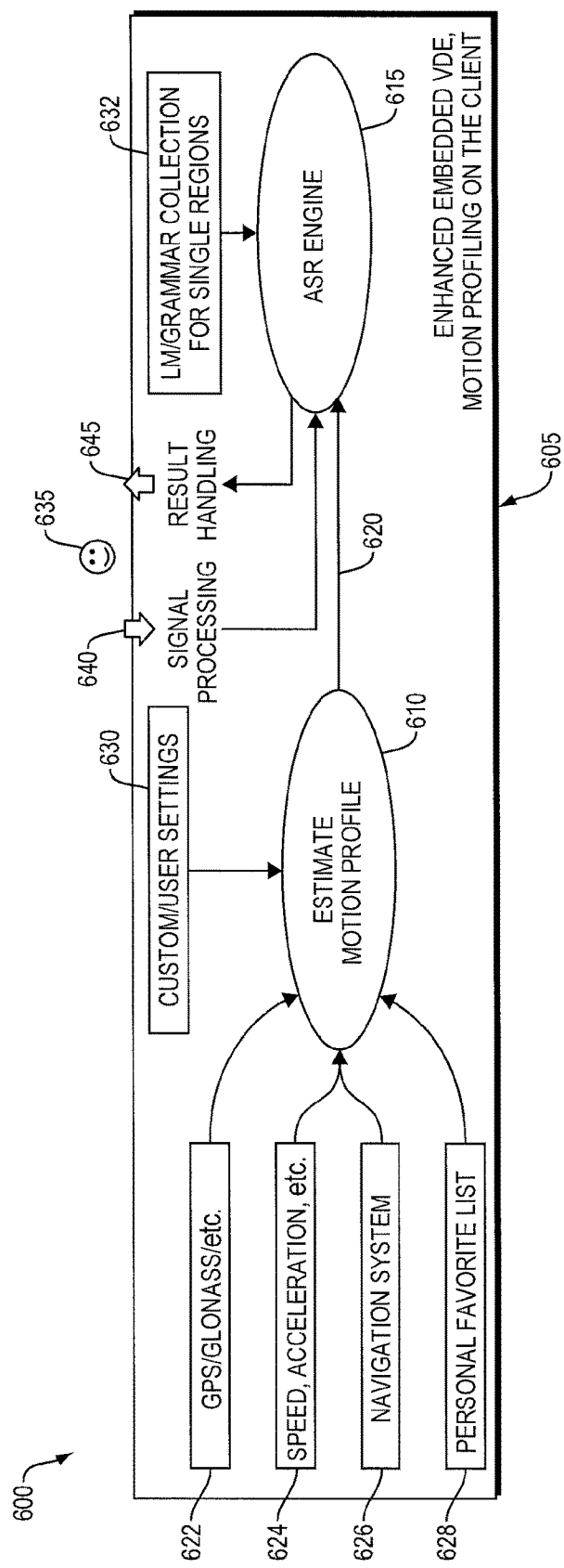
FIG. 6 illustrates an example embedded use-case for motion adaptive speech recognition.

FIG. 6 illustrates an example embedded use-case for motion adaptive speech recognition. System 600 for motion adaptive speech processing includes client 605 and a motion profile estimator 610 and a processor 615 at the client. The motion profile estimator 610 is configured to estimate a motion profile 620 that is representative of a user's motion and that is dynamically based on data from one or more resources associated with the user 635. In the example system 600, the processor 615 is configured to effect processing of a speech signal 640 received from the user 635, e.g., while the user is in motion. The speech signal is processed taking into account the estimated motion profile 620 to produce an interpretation 645 of the speech signal. As shown, resources associated with the user can include position data 622, for example, from GPS, GLONASS or other systems or sensors; motion data 624, e.g., speed, acceleration, etc., which can be derived data or data measured by one or more sensors; navigation system data 626; a user's personal favorites list 628; and data relating to custom settings or user defined settings 630. Another resource available to the automatic speech processing engine that can be implemented on processor 615 is a data store 632 that stores a collection of language models and grammars for single regions. For example, data store 632 can be database 135 described with reference to FIG. 1.

In the example embodiment shown in FIG. 6, the motion profile estimator 610 is configured to compute a motion weight vector using the data from the one or more resources associated with the user. The motion vector provides a snap shot of the user's position and motion. The motion profile is a collection of such snap shots. Further, the motion profile estimator can be configured to interpolate a plurality of models using the motion weight vector to generate a motion adaptive model. At least one of the models can be associated with a geographic area, and the motion profile estimator can interpolate the models to produce a probability that the user is or will be located in the geographic area. Alternatively or in addition, the motion profile estimator can be further configured to interpolate the motion adaptive model with a background model.

In the embodiment of the system 600 for motion adaptive speech processing illustrated in FIG. 6, the processor 615 is configured to perform automatic speech recognition (ASR) of the speech signal 640 at the client 605 using the estimated motion profile 620. The ASR by processor 615 produces the interpretation 645 of the speech signal, directly or via an intermediate ASR result.

The system 600 features an ASR engine with an on-the-fly language model adaptation technique. In addition, many current deployments are realizable using this system, e.g., activation/deactivation, linguistic constraints, dialog and others.

The client 605 of system 600 may be implemented on one device, such as a smart phone or a car head unit (e.g., navigation system). Alternatively, the functionality of the client 605 may be implemented in two or more devices. For example, an aspect of client 605, (e.g., the motion profile estimator 610) can be implemented on the car head unit and another aspect (e.g., the processor 615 including the ASR engine) on the smart phone. In one such scenario, the car head unit computes the motion weight vector and communicates the vector to the smart phone. The smart phone performs the motion adaptive ASR using the motion vector from the car head unit and, optionally, one or more language, grammar or other models described herein. Alternatively, the smart phone can use the motion weight vector from the car head unit and pass the vector and the speech signal to the cloud for hybrid speech recognition. A hybrid use-case is described below.

Figure 7:
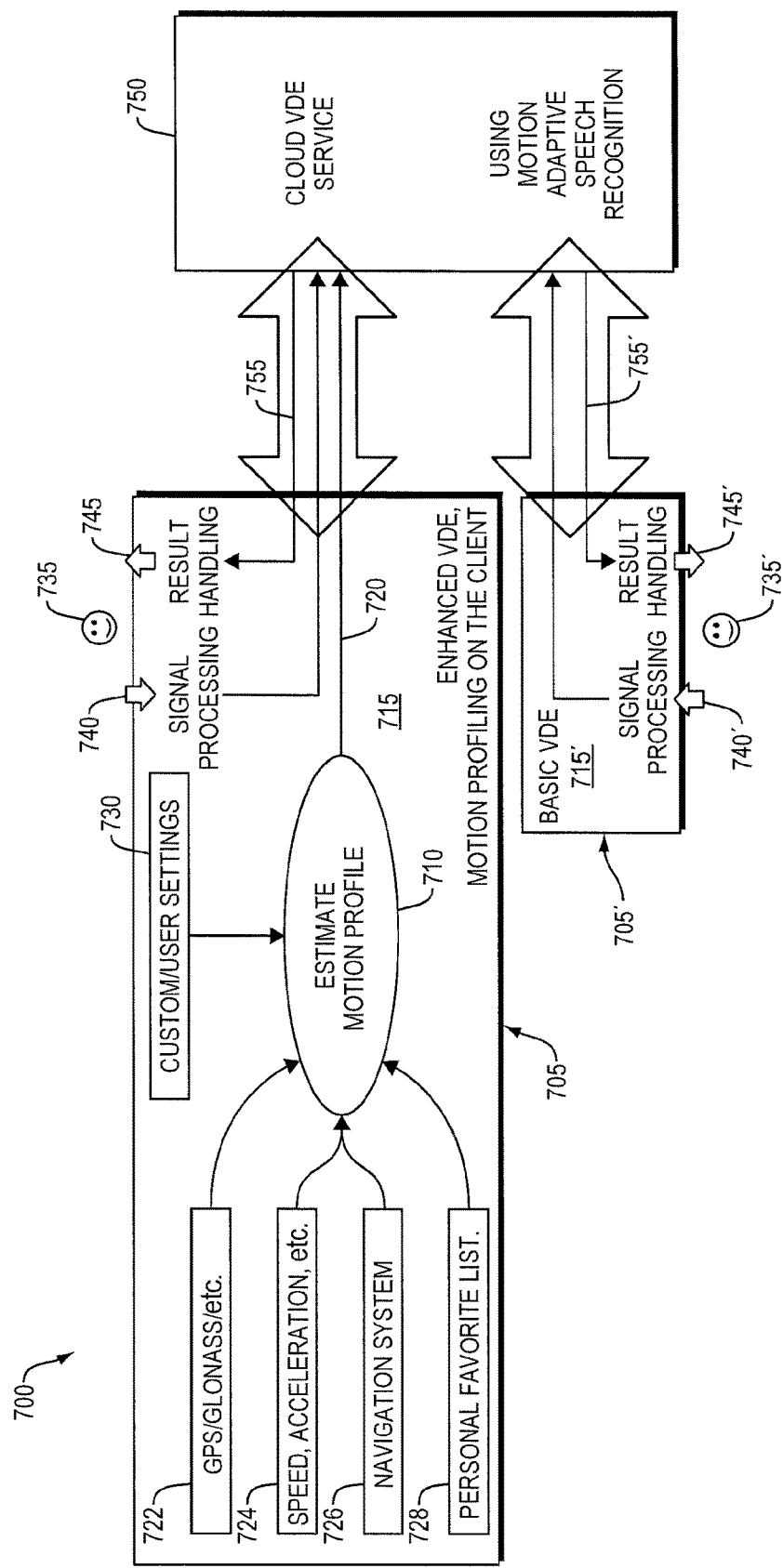
FIG. 7 illustrates an example hybrid use-case for motion adaptive speech recognition.

FIG. 7 illustrates an example hybrid-use case for motion adaptive speech recognition. System 700 includes client 705 and a cloud service 750 that is configured for motion adaptive speech processing, e.g., a cloud voice data entry (VDE) service using motion adaptive speech recognition. The client 705 includes a motion profile estimator 710 and a processor 715. The client can be configured for enhanced VDE with motion profiling on the client. In one example, the client 710 is implemented on a car head unit. The motion profile estimator 710 is configured to estimate a motion profile 720 that is representative of a user's motion and is dynamically based on data from one or more resources 722, 724, 726, 728 and 730 associated with the user 735. Similar to the resources described with reference to system 600, the resources associated with the user in system 700 can include position data 722 (e.g., from GPS, GLONASS, etc.), motion data 724 (e.g., speed, acceleration, etc.), navigation system data 726, personal data 728 (e.g., a personal favorites list), and data relating to custom settings or user defined settings 730. In the example system 700, the processor 715 is configured to effect processing of a speech signal 740 received from the user 735, e.g., while the user is in motion. The speech signal 740 is processed by the cloud service 750 taking into account the estimated motion profile 720 to produce an interpretation 745 of the speech, signal.

In the embodiment illustrated in FIG. 7, the processor 715 is configured to send the speech signal 740 and the estimated motion profile 720 to the cloud service 750. The cloud service 750 performs automatic speech recognition (ASR) of the speech signal 740 using the estimated motion profile 720. The ASR produces a result 755, which is sent back to the client 707 to be handled. For example, the result 755 can be presented to the user 735 as an interpretation 745 of the speech signal 740. The result 755 can also go into a background language model, e.g., to update a background language model at the cloud service 750, so that other users can benefit. Multiple background models are contemplated, e.g., models specific to restaurants, events, etc.

As further illustrated in FIG. 7, a client 705' that is configured for basic VDE, without motion adaptive speech recognition, can operate within system 700. The client 705' can be implemented on a smart phone, e.g., for user who do not have a motion profile but that can benefit from interacting with cloud service 750. Client 705' includes a processor 715' configured to effect processing of a speech signal 740' received from a user 735'. The speech signal is transmitted from the client 705' to the cloud service 750, processed, and a result 755' is returned to the client. The client handles the result 755' to produce an interpretation 745' of the speech signal, e.g., for presentation to the user.

Thus, the system 700 can serve existing customers and users, such as described for user 735', and can adapt to and accommodate customer- and user-dependent behavior, such as described for the behavior (e.g., motion profile) of user 735.

Figure 8:
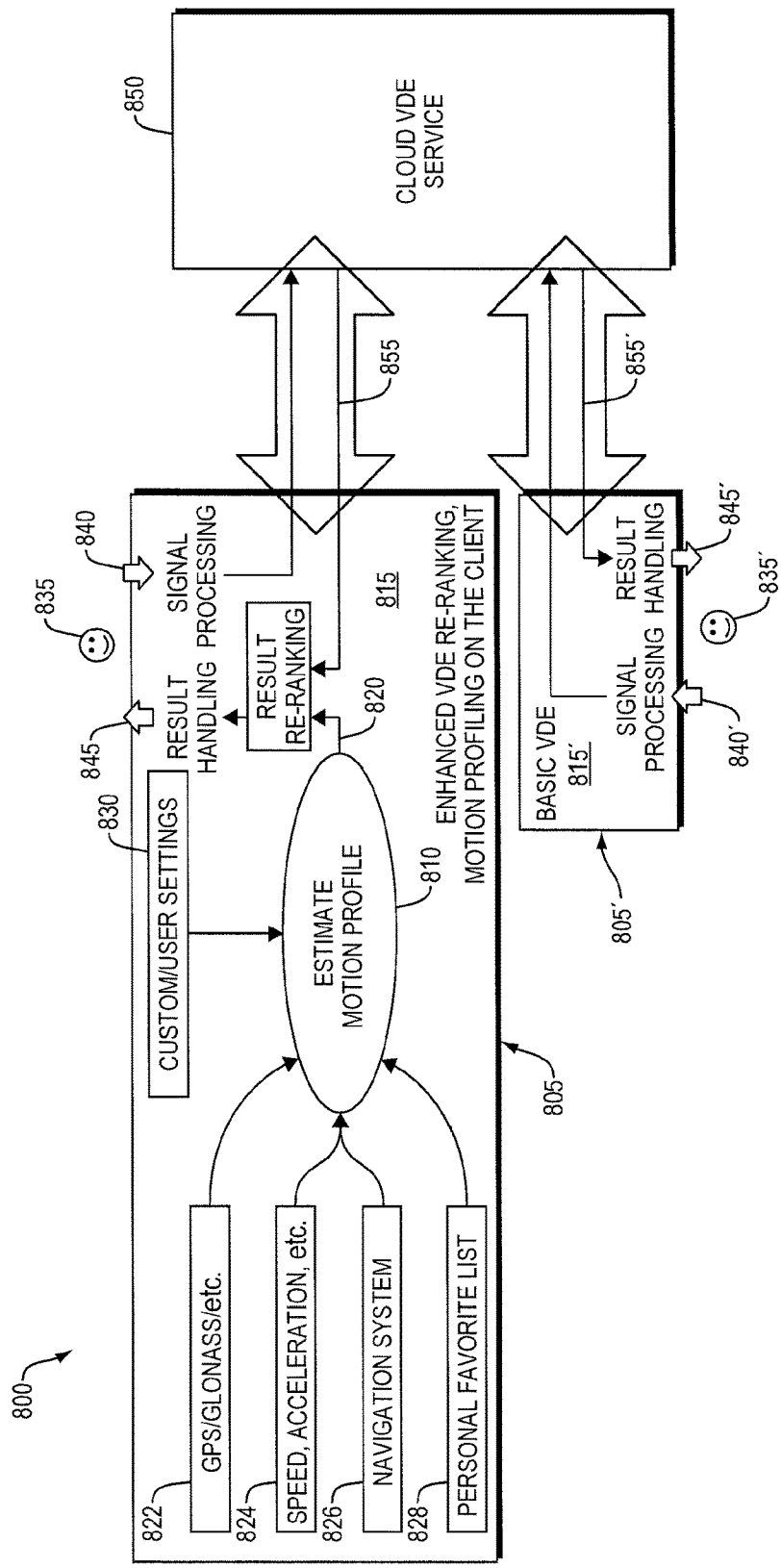
FIG. 8 illustrates an example of re-ranking of automatic speech recognition (ASR) results for motion adaptive speech recognition.

FIG. 8 illustrates an example of re-ranking of automatic speech recognition (ASR) results for motion adaptive speech recognition. System 800 for motion adaptive speech processing includes a client 805 and a cloud service 850, e.g. a cloud VDE service. The client 805 includes a motion profile estimator 810 that is configured to estimate a motion profile 820. As described above, the motion profile is representative of a user's motion and is dynamically based on data from one or more resources associated with the user 835. Resources associated with the user in system 800 can include position data 822 (e.g., from GPS, GLONASS, etc.), motion data 824 (e.g., speed, acceleration, etc.), navigation system data 826, personal data 828 (e.g., a personal favorites list), and data relating to custom settings or user defined settings 830. Similar to system 700, system 800 includes a processor 815 at the client 805 that is configured to effect processing of a speech signal 840 received from the user 835, e.g., while the user is in motion. The speech signal 840 is processed by the cloud service 850, but, unlike the cloud service 750 in system 700, the cloud service 850 is not configured for motion adaptive speech recognition and does not receive the estimated motion profile 820. Instead, processing of speech recognition results occurs at the client 805 taking into account the estimated motion profile 820 to produce an interpretation 845 of the speech signal.

In the embodiment illustrated in FIG. 8, the processor 815 is configured to send the speech signal 840 to the cloud service 850 for ASR, receive results 855 of the ASR from the cloud service, and re-rank (860) the results using the estimated motion profile 820 to produce the interpretation 845 of the speech signal.

System 800 can serve existing customers and users, e.g., user 835', and, at least the client 805 of system 800 can adapt to and accommodate customer- and user-dependent behavior, e.g., the behavior and motion profile of user 835. As illustrated in FIG. 8, a client 805' that is configured for basic VDE, but not for using motion adaptive ASR, can operate within system 800. The client 805' can be implemented on a smart phone or other mobile device that can interact with cloud service 850. The client 805' includes a processor 815' that is configured to effect processing of a speech signal 840' received from the user 835'. The speech signal is transmitted from the client 805' to the cloud service 850 and processed at the cloud service. A result 855' of the processing is returned to the client to produce an interpretation 845' of the speech signal.

A system in accordance with the invention has been described which enables a system, e.g., a speech recognition system, to perform motion adaptive speech processing. Components of such a system, for example a motion profile estimator, an interpolation module, a motion adaptive automatic speech recognizer and other systems discussed herein may, for example, be a portion of program code, operating on a computer processor.

Portions of the above-described embodiments of the present invention can be implemented using one or more computer systems, for example, to permit dynamically estimating a motion profile that is representative of a user's motion and effecting processing of a speech signal received from the user while in motion. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a rack-mounted computer, desktop computer, laptop computer, or tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-described functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, RAM, flash memory, or other type of computer memory), magnetic disc or tape, optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. It should also be appreciated that the various technical features of the embodiments that have been described may be combined in various ways to produce numerous additional embodiments.

What is claimed is:

1. A method for motion adaptive speech processing for voice destination entry, the method comprising:
   dynamically estimating a motion profile that is representative of a user's motion based on data from one or more resources associated with the user, the motion profile being a collection of snap shots of the user's position and motion, the data from the one or more resources including sensor data and data from a non-speech resource associated with the user;
   wherein dynamically estimating the motion profile includes computing a motion weight vector using the data from the one or more resources associated with the user and interpolating a plurality of models using the motion weight vector to generate a motion adaptive model, wherein at least one of the models is associated with a geographic area, and wherein interpolating the models results in a probability that the user is or will be located in the geographic area; and
   effecting processing of a speech signal received from the user, the processing taking into account the estimated motion profile by constraining a search space to user-relevant destinations based on the motion adaptive model to produce an interpretation of the speech signal.

2. The method according to claim 1, wherein the sensor data include at least one member selected from the group consisting of position, speed, acceleration, direction, and a combination thereof.

3. The method according to claim 2, wherein the data from the non-speech resource includes at least one member selected from the group consisting of navigation system data, address book data, calendar data, motion history data, crowd sourced data, configuration data, and a combination thereof.

4. The method according to claim 1, wherein computing the motion weight vector includes determining a relation between the non-speech resource and a language resource associated with the plurality of models.

5. The method according to claim 1, wherein dynamically estimating the motion profile further includes interpolating the motion adaptive model with a background model.

6. The method according to claim 1, wherein the speech signal includes at least one of a voice audio signal, a video signal and data from gestures or text entry.

7. A system for motion adaptive speech processing for voice destination entry, the system comprising:
   a motion profile estimator at a client, the estimator configured to estimate a motion profile that is representative of a user's motion dynamically based on data from one or more resources associated with the user, the motion profile being a collection of snap shots of the user's position and motion, the data from the one or more resources including sensor data and data from a non-speech resource associated with the user;

wherein the motion profile estimator is configured to compute a motion weight vector using the data from the one or more resources associated with the user and to interpolate a plurality of models using the motion weight vector to generate a motion adaptive model, wherein at least one of the models is associated with a geographic area, and wherein the motion profile estimator interpolates the models to produce a probability that the user is or will be located in the geographic area; and a processor configured to effect processing of a speech signal received from the user, the processing taking into account the estimated motion profile by constraining a search space to user-relevant destinations based on the motion adaptive model to produce an interpretation of the speech signal.

8. The system according to claim 7, wherein the motion profile estimator is further configured to interpolate the motion adaptive model with a background model.

9. The system according to claim 7, wherein the processor is configured to perform automatic speech recognition (ASR) of the speech signal at the client using the estimated motion profile, the ASR producing the interpretation of the speech signal.

10. The system according to claim 7, wherein the processor is configured to send the speech signal and estimated motion profile to a cloud service to perform automatic speech recognition (ASR) of the speech signal using the estimated motion profile, the ASR producing the interpretation of the speech signal.

11. The system according to claim 7, wherein the processor is configured to send the speech signal to a cloud service for automatic speech recognition (ASR), receive results of the ASR from the cloud service, and re-rank the results using the estimated motion profile to produce the interpretation of the speech signal.

12. A computer program product comprising a non-transitory computer readable medium storing instructions for performing a method for motion adaptive speech processing for voice destination entry, the instructions, when executed by a processor, cause the processor to:

dynamically estimate a motion profile that is representative of a user's motion based on data from one or more resources associated with the user, the motion profile being a collection of snap shots of the user's position and motion, the data from the one or more resources including sensor data and data from a non-speech resource associated with the user;

wherein dynamically estimating the motion profile includes computing a motion weight vector using the data from the one or more resources associated with the user and interpolating a plurality of models using the motion weight vector to generate a motion adaptive model, wherein at least one of the models is associated with a geographic area, and wherein interpolating the models results in a probability that the user is or will be located in the geographic area; and effect processing of a speech signal received from the user, the processing taking into account the estimated motion profile by constraining a search space to user-relevant destinations based on the motion adaptive model, to produce an interpretation of the speech signal.

* * * * *